United States Patent Office 3,133,933
Patented May 19, 1964

3,133,933
CERTAIN 1,4-DIARYL-3,5-DIOXO-1,2,4-TRIAZOLIDINES
Heinrich Ruschig, Bad Soden, Taunus, Karl Schmitt and Leopold Ther, Frankfurt am Main, and Werner Pfaff, Hofheim-Marxheim, Taunus, Germany, assignors to Farbwerke Hoechst Aktiengesellschaft vormals Meister Lucius & Brüning, Frankfurt am Main, Germany, a corporation of Germany
No Drawing. Filed Feb. 28, 1961, Ser. No. 92,150
Claims priority, application Germany Mar. 4, 1960
5 Claims. (Cl. 260—308)

The present invention relates to new triazolidines of the Formula I

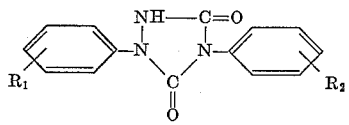

(I)

in which $R_1$ represents a hydrogen or halogen atom, an alkyl or alkoxy group containing 1 to 4 carbon atoms, and $R_2$ represents an alkoxy group containing 1 to 4 carbon atoms, a hydroxy-alkoxy group containing up to 4 carbon atoms, a phenoxy or benzyloxy group, or an aliphatic acylamino group containing up to 4 carbon atoms, and to pharmaceutical compositions containing these triazolidines as active ingredients.

The new products, viz. compositions, are valuable medicaments which, in addition to possessing good physiological tolerability, are particularly distinguished by antiphlogistic properties.

The present invention further relates to the preparation of the said products which may be synthesized according to methods which may generally be used for the manufacture of triazolidines.

The new products of the invention can be prepared, for example:

(a) By treating reactive, functional derivatives of semicarbazide-carboxylic acids of the Formula II or IIa

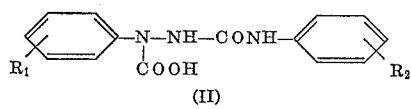

(II)

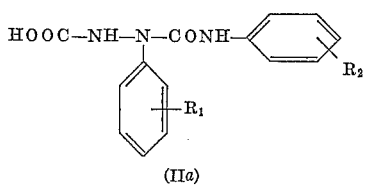

(IIa)

with alkaline agents or by heating them in the absence of alkaline agents, or (b) By reacting semicarbazides of the Formula III or IIIa

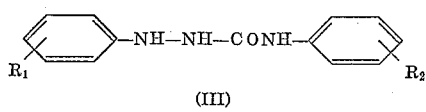

(III)

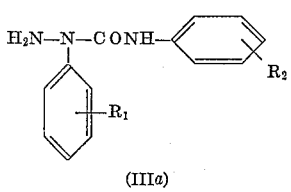

(IIIa)

with reactive derivatives of the carbonic acid, or (c) By reacting functional derivatives of phenylhydrazine-$N^1,N^2$-dicarboxylic acids of the Formula IV

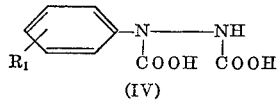

(IV)

with primary amines of the Formula V

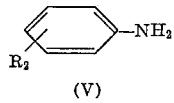

(V)

or (d) By reacting functional derivatives of phenylhydrazine-$N^1$- or $N^2$-monocarboxylic acids of the Formula VI or VIa

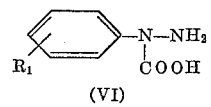

(VI)

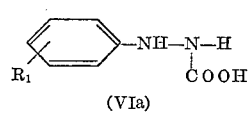

(VIa)

with reactive functional N-carboxylic acid derivatives of primary amines of the Formula V, or (e) By reacting phenylhydrazines of the formula

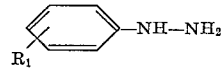

with amines of the Formula V in the presence of reactive derivatives of the carbonic acid, or (f) Replacing the sulfur atom in thio-triazolidines of the Formula VII

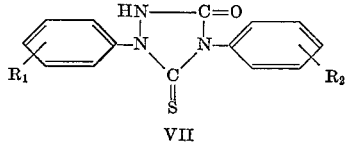

VII by an oxygen atom, or (g) By reacting triazolidines of the Formula VIII

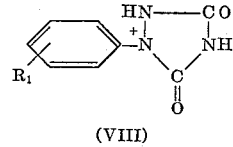

(VIII)

with amines of the formula V, or (h) By reacting oxdiazolone derivatives of the Formula IX

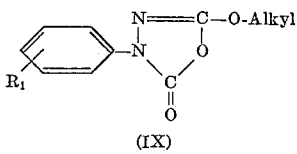

(IX)

with amines of the Formula V, and, if desired, converting the compounds thus obtained into the corresponding salts by treatment with inorganic or organic bases.

As substituents $R_1$ and $R_2$ of the Formula I of the products of the present invention, there are mentioned by way of example.

$R_1$: Hydrogen, fluorine, chlorine, bromine, iodine, methyl, ethyl, propyl, isopropyl, n-butyl, isobutyl, sec. butyl, tert. butyl, methoxy, ethoxy, n-propoxy, isopropoxy, n-butoxy, sec. butoxy, isobutoxy.

$R_2$: Methoxy, ethoxy, n-propoxy, isopropoxy, n-butoxy, sec. butoxy, isobutoxy, β-hydroxy-ethoxy, benzyloxy, o-, m- or p-methoxy-benzyloxy, phenoxy, o-, m- or p-methoxy-phenoxy, p-chloro-phenoxy, O-methyl-phenoxy, formylamino, acetamino, butyrylamino, β-chloro-ethoxy.

The substituents may be bound in any position of the phenyl nucleus.

As starting substances of the process of the present invention there are mentioned, for example, the following semicarbazide derivatives corresponding to the Formulae II and IIa, or their functional reactive derivatives:

1- or 2-phenyl-4-(2-, 3- or 4-methoxy-or ethoxy-phenyl)-semicarbazide-carboxylic acid-(1), 1- or 2-phenyl-4-(4-chloro-phenyl)-semicarbazide-carboxylic acid-(1), 1 or 2,4-bis-(4-chloro-phenyl)-semicarbazide-carboxylic acid-(1), 1- or 2-phenyl-4-(4-n-butoxy-phenyl)-semicarbazide-carboxylic acid-(1), 1- or 2-phenyl-4-(4-hydroxy-phenyl)-semicarbazide-carboxylic acid-(1), 1- or 2,4 - bis - (4 - methoxy-phenyl)-semicarbazide-carboxylic acid-(1), 1- or 2-(2-, 3- or 4-methyl-phenyl)-4-(2-, 3- or 4-ethoxy-phenyl)-semicarbazide-carboxylic acid-(1), 1- or 2-(2-, 3- or 4-n-propylphenyl)-4-(4-isopropoxy-phenyl)-semicarbazide-carboxylic acid-(1), 1- or 2-phenyl-4-(4-acetylamino-phenyl)-semicarbazide-carboxylic acid-(1), 1- or 2-(2-, 3- or 4-chloro-phenyl)-4-(4-acetylamino-phenyl)-semicarbazide-carboxylic acid-(1), 1- or 2-(4-n-butoxy-phenyl)-4-(2-, 3- or 4-chloro-phenyl)-semicarbazide-carboxylic acid-(1), 1- or 2 - phenyl-4-(4-n-propoxy-phenyl)-semicarbazide-carboxylic acid-(1), 1- or 2-phenyl-4-(4-benzyloxy-phenyl)-semicarbazide-carboxylic acid-(1), 1- or 2-phenyl-[4-(β-hydroxy-ethoxy)-phenyl]-semicarbazide-carboxylic acid-(1), 1- or 2-phenyl-4-(4-phenoxy-phenyl)-semicarbazide-carboxylic acid-(1), 1- or 2 - (4-chloro-phenyl)-4-(4-ethoxy-phenyl)-semicarbazide-carboxylic acid-(1).

As functional reactive derivatives there are suitable, for example, the esters, halides or amides of the aforementioned compounds.

As starting substances which correspond to the Formulae III and IIIa, there enter into consideration the semicarbazides from which the afore-mentioned semicarbazide-carboxylic acids are derived.

As reactive $N^1, N^2$-dicarboxylic acid-derivatives of phenyl-hydrazines of the Formula IV, which can be converted into 3,5-dioxo-1,2,4-triazolidines by reaction with amines of the Formula V, there are suitable, for example, the esters, halides or amides thereof, As reactive $N^1$- or $N^2$-monocarboxylic acid derivatives of phenylhydrazines (cf. Formulae VI and VIa) which may be converted into 3,5-dioxo-1,2,4-triazolidines by reaction with reactive functional N-carboxylic acid derivatives of amines of the Formula V, there also enter into consideration, for example, the esters, halides or amides thereof. The designation "reactive N-carboxylic acid-derivatives of amines" is understood to comprise, for example, corresponding phenyl ureas, phenylcarbamic acid esters or phenylcarbamic acid halides.

The compounds specified by the Formulae VII, VIII and IX, which may also be used as starting substances for the manufacture of the claimed products, are likewise based on such amines of the Formula V and/or phenylhydrazines as those contained in the above-mentioned semicarbazide-carboxylic acids.

If the process of the present invention is started with compounds of the Formula II or IIa as starting substances, it is advantageous to use these starting substances in the form of their functional reactive derivatives, preferably in the form of their esters with low molecular alcohols or with phenols. The ring closure described under (a) by which the 3,5-dioxo-1,2,4-triazolidine derivatives are formed, is advantageously effected by treatment with alkaline agents and can be carried out in the presence of water as well as in the presence of organic solvents, especially of alcohols, for example methanol or ethanol, or of dialkylformamides such as dimethylformamide. As alkaline agents, there are suitable, in particular, alkali metal hydroxides, alkaline earth metal hydroxides or alkali metal alcoholates; however, other basic agents such as alkali metal or alkaline earth metal carbonates, ammonia or organic bases may also be used. The ring closure takes place in some cases already at room temperature; in other cases, however, it is more advantageous to apply elevated temperatures in order to attain higher reaction speeds. It is advantageous to operate at the boiling temperature of the solvent used. The 3,5-dioxo-1,2,4-triazolidines formed show an acid reaction and, due to the alkaline reaction medium, precipitate in the form of salts. For processing, it is therefore advantageous to convert the compounds by treatment with organic or inorganic acids into the free compounds and to purify them by recrystallization or precipitation from an alkaline solution. The ring closure may also be effected without the use of alkaline agents; in this case, however, it is necessary to apply higher temperatures, for example temperatures above 80° C., in many cases even above 150° C. In this case, the reaction is effected without any solvent and the reaction products obtained are purified by taking them up in alkali; this measure allows of separating any neutral by-products that may have formed.

The starting substances of the Formulae II and IIa or their reactive functional derivatives may be prepared according to known methods, for example by reaction of suitable phenylhydrazine-$N^1,N^2$-dicarboxylic acid derivatives, such as phenylhydrazine-N-carboxylic acid ester-N'-carboxylic acid halides, with suitable aniline derivatives, or by the reaction of phenylhydrazine-monocarboxylic acid derivatives with suitably substituted phenylisocyanates. In general, it is not necessary to isolate or to purify the mentioned semicarbazide-carboxylic derivatives. They can be reacted in the reaction mixture in which they were formed or as crude products either directly by treatment with alkali or by heating to form the desired 3,5-dioxo-1,2,4-triazolidines. It is furthermore also possible to combine both methods of operation, for example, first to heat the concerned semi-carbazide-carboxylic acid derivative in the absence of alkaline agents and then to treat it with alkaline agents.

The conversion of the starting compounds of the Formula III or IIIa into the desired 3,5-dioxo-1,2,4-triazolodines is effected in a manner similar to the reaction described above. This method is, too, carried out according to methods known in principle in the application for other starting substances. The reaction can be effected, for example, in the presence or in the absence of a solvent, the reaction temperature depending on the reactivity of the carbonic acid derivative used. As solvents or as distributing agents, there are mentioned, for example, aromatic hydrocarbons such as benzene, toluene or xylene. If, for example, phosgene is used as carbonic acid derivative, the triazolidine ring closure can be brought about by heating in benzene/toluene, while with urea as a reaction component, it is advantageous to operate in the melt at temperatures above 150° C.

Similar conditions exist with the other operational methods of the process of the present invention which consist in reacting suitable phenylhydrazine-$N^1,N^2$-dicarboxylic acid derivatives of the Formula IV, for example their halides or esters with low molecular alcohols or phenols or their amides, with primary amines of the Formula V, which may also be used in the form of salts of mineral acids, or in reacting reactive derivatives of phenylhydrazine-$N^1$- or $N^2$-monocarboxylic acids of the Formula VI or VIa with reactive N-carboxylic acid derivatives of the primary amines of the Formula V. As such, there enter into consideration, for example, phenyl ureas, phenylcarbamic acid esters, or phenylcarbamic acid chlorides. Phenylhydrazines of the formula R—NH—$NH_2$ react under similar conditions with primary amines of the Formula V; the latter may also be applied in form of corresponding salts with inorganic or organic acids. As a reactive carbonic acid derivative, urea is particularly suitable; the reaction can be effected at temperatures in the range of 180° and 220° C.

According to another method of operation, triazolidines of the Formula VIII which are substituted in 1-position as well as oxdiazolone derivatives of the Formula IX can be caused to act under similar conditions upon the corresponding amines of the Formula V. It may sometimes be advantageous to effect such condensations in the presence of an alkaline condensing agent, for example, an alkali metal, an alkali metal hydroxide, an alkali metal alcoholate, or an alkali metal amide. The reaction products are advantageously separated from neutral by-products or from starting substances by treatment of the reaction mixture with aqueous or aqueous-alcoholic alkali in which the 3,5-dioxo-1,2,4-triazolidines are generally easily soluble and whereby the ring closure reaction may, if required, also be completed. Acidification of the alkaline solution with inorganic or organic acids yields the free 3,5-dioxo-1,2,4-triazolidines which generally separate in crystalline form; they can be purified in the usual manner, for example, by recrystallization from a suitable solvent.

The replacement of the sulfur atom in thiotriazolidines of the Formula VII by an oxygen atom is likewise a reaction being already known in the application to other starting substances. For such a reaction, it is suitable to use an oxidation agent, for example, potassium permanganate, which rapidly acts in the cold on a thiotriazolidine dissolved in, for example, aqueous alkali. The reaction is advantageously completed by a moderate heating and, after having been filtered with suction to remove the manganese dioxide formed, the reaction solution is processed in the usual manner. It is also possible to replace the sulfur by oxygen with the aid of a heavy metal oxide such as mercuric oxide while carrying out the operation in an inert organic solvent, for example, benzene, toluene, cumol or cymol, and applying temperatures of above 100° C., preferably about 150° C., and, if necessary, carrying out the reaction in an autoclave.

The 3,5-dioxo-1,2,4-triazolidines obtained by the process of the present invention are acidic compounds which can be converted into the corresponding physiologically compatible salts in the usual manner by treatment with inorganic or organic bases. As inorganic bases, there are mentioned, for example, alkali metal or alkaline earth metal hydroxides, -alcoholates or -hydrides, preferably sodium hydroxide, sodium methylate, sodium ethylate, sodium hydride, magnesium hydroxide and calcium hydroxide. As organic bases, there are suitable especially aliphatic amines, for example, β-dimethyl-aminoethanol, β-diethylaminoethanol, diethanolamine, triethanolamine, diethanolmethylamine, etc. With regard to their use as medicaments, the corresponding alkali metal and alkaline earth metal salts are of special importance, which in most cases are water-soluble and whose solutions exhibit a physiological pH value.

The products of the present invention are valuable medicaments. In particular, they exhibit an antiphlogistic activity but they are also hypotensively and/or analgesically active and further cause dilation of the blood vessels, especially of the coronary vessels. The products are physiologically well tolerated. For example, the sodium salt of 1-phenyl-4-(4-ethoxy-phenyl)-3,5-dioxo-1,2, 4-triazolidine shows in the aerosil test on a rat's paw, in a dosage of 500 mg./kg., a strong, long-lasting antiphlogistic effect. The $LD_{50}$ in the mouse, upon intravenous application, amounts to about 800 mg./kg.; hence, this product has a considerable therapeutic application range. The strong antiphlogistic action of the products of the present invention was very surprising because previous tests with already known triazolidines, for example, the 1,4-diphenyl-3,5-dioxo-1,2,4-triazolidine, the 1-(p-methylphenyl)-4-phenyl-3,5-dioxo - 1,2,4 - triazolidine or the 1-phenyl - 4 - (p-methyl-phenyl)-3,5-dioxo-1,2,4-triazolidine, revealed that these compounds have no antiphlogistic properties.

The excellent antiphlogistic activity of the new triazolidines could also be corroborated by clinical tests. Thus, several cases of Polyarthritis rheumatica and Neuritis ischiatica were healed by oral administration of the compound 1 - phenyl-4-(4-ethoxy-phenyl)-3,5-dioxo-1,2,4-triazolidine. The compound was administered to the patients in the form of capsules containing about 100 mg. thereof as active ingredients. The doses were: about 100 mg. the first day and 200 mg. per day the two following days. The fourth day after the beginning of the treatment the rheumatic pains had disappeared. Thus, the compounds of the present invention showed far better results than the known antirheumatics.

For the therapy in human beings, pharmaceutical compositions in dosage unit form, each unit containing the active ingredient in a range from 50 to 200 mg., are suitable.

The products of the present invention can be administered as such or in form of their corresponding salts, if necessary, also in admixture with non-toxic pharmaceutically suitable, solid or liquid carriers, such as water, vegetable oils, various kinds of starch, or with auxiliary substances, such as stabilizing, wetting or emulsifying agents. They can be administered in the form of tablets, dragées, capsules, solutions, suspensions, etc. either orally or parenterally. If oral application is desired, these products can be processed as active substance together with the usual carriers such as lactose, starch, rubber, tragacanth, and magnesium stearate, into preparations in dosage unit form, for example, into tablets or dragées.

The following examples illustrate the invention but they are not intended to limit it thereto:

EXAMPLE 1

*1-Phenyl-4-(4-Hydroxy-Phenyl)-3,5-Dioxo-1,2,4-Triazolidine*

A solution of 43.6 g. of 4-amino-phenol in 150 cc. of dimethylformamide is added to a solution of 48.5 g. of phenylhydrazine-β-carboxylic acid-ethyl ester-α-carboxylic acid-chloride in 100 cc. of dimethylformamide, and after the reaction heat has decayed, the mixture is shortly heated on the steam bath. To the solution of 2-phenyl-4-(4-hydroxy-phenyl)-semicarbazide-carboxylic acid - (1) - ethyl ester thus obtained, there are added 200 cc. of 2 N-sodium hydroxide solution and the whole is heated for 10–15 minutes on the steam bath. The reaction solution is diluted with water and then stirred into an excess quantity of dilute hydrochloric acid whereby the triazolidine precipitates in solid form (47.8 g.); after recrystallization from ethanol the product melts at 270–273° C. By lyophilizing a solution of the triazolidine in an equivalent quantity of sodium hydroxide solution, the sodium salt is obtained in the form of a colorless powder which dissolves in water while showing a neutral reaction.

EXAMPLE 2

*1-Phenyl-4-(4-Ethoxy-Phenyl)-3,5-Dioxo-1,2,4-Triazolidine*

(a) A solution of 34.3 g. of 2-phenyl-4-(p-ethoxyphenyl)-semicarbazide - carboxylic acid - (1) - ethyl ester having a melting point of 140–141° C. in 200 cc. of methanol is heated with 5.5 g. of sodium methylate to the boil until a sample of the solution remains clear when diluted with water. The reaction solution is diluted with water and acidified with hydrochloric acid, whereby the triazolidine is precipitated in crystalline form. The product is recrystallized from alcohol; it melts then at 193–195° C.

(b) The reaction mixture which is obtained by heating, to 60–70° C. for one hour, 55 g. of p-phenetidine and 48.5 g. of phenylhydrazine-β-carboxylic acid-ethyl ester-α-carboxylic acid-chloride, is heated on the steam bath together with 200 cc. of 2 N-sodium hydroxide solution for so long a period until the solution remains clear. Upon acidification with acetic acid there is obtained the same triazolidine as described in Example 2(a).

(c) The same compound is obtained when phenyl-hydrazine-β-carboxylic acid-methyl ester-α-carboxylic acid-chloride, having a melting point of 98–100° C., is heated for 3 hours with the calculated quantity of p-phenetidine, while slowly raising the temperature to 190° C. and several times recrystallizing the reaction mixture from alcohol.

(d) The same compound is formed, when a solution of 1-phenyl-4-(4-ethoxy-phenyl)-semicarbazide, having a melting point of 170–172° C. in toluene with an excess quantity of phosgene, is heated for some hours to 90–110° C., the reaction solution is cooled, inoculated, and the product is purified via the sodium salt.

(e) The same compound is obtained, when 1-phenyl-4-(p-ethoxy-phenyl)-semicarbazide-carboxylic acid-(1)-ethyl ester having a melting point of 147–148° C. (prepared by heating 1-phenyl-4-(4-ethoxy-phenyl)-semicarbazide with chloroacetic acid ethyl ester in benzene) together with a dilute sodium hydroxide solution is heated for some minutes on the steam bath and the solution is worked up in the usual manner.

(f) Equimolar quantities of phenylhydrazine-β-carboxylic acid-methyl ester and (4-ethoxy-phenyl)-carbamic acid-methyl ester, having a melting point of 97–99° C., are heated for several hours while slowly raising the temperature from 150 to 200° C., the reaction product is taken up in aqueous-alcoholic sodium hydroxide solution, and neutral components are separated by filtration with suction or extraction with ether. The 1-phenyl-4-(4-ethoxy-phenyl)-3,5-dioxo-1,2,4-triazolidine is precipitated by acidification of the alkaline solution, filtered off with suction and recrystallized from alcohol.

(g) The same compound is formed, when 2-phenyl-4-(4-ethoxy-phenyl)-semicarbazide-carboxylic acid-(1)-ethyl ester having a melting point of 140–141° C. is heated for several hours to 140–180° C. and the reaction product is several times recrystallized from ethanol after having cooled.

(h) The same compound is obtained when an alkaline solution of 1-phenyl-4-(4-ethoxy-phenyl)-3-oxo-5-thio-1,2,4-triazolidine having a melting point of 240–243° (prepared by condensation of phenylhydrazine-β-carboxylic acid-ethyl ester-α-thiocarboxylic acid-chloride with p-phenetidine and subsequent treatment with a sodium hydroxide solution) is treated with a slight excess of potassium permanganate and the reaction is completed by a moderate heating. A green coloration which might remain behind is removed by the addition of some drops of methanol, the whole is filtered off with suction from the manganese dioxide, the filtrate is acidified, and the product is purified by recrystallization from alcohol.

(i) The same compound is obtained when equimolar quantities of 1-phenyl-semicarbazide and (4-ethoxy-phenyl)-carbamic acid-methyl ester, having a melting point of 97–99° C., are heated for two to three hours to 160–185° C. and the triazolidine is isolated in the manner described in Example 2(f).

(k) The same compound is obtained when heating for several hours to 170–200° C., 1-phenyl-4-(4-ethoxy-phenyl)-semicarbazide having a melting point of 170–172° C., together with urea applied in an excess of 20%. The triazolidine is isolated in the manner described in Example 2(f).

(l) Equimolar quantities of 5-ethoxy-3-phenyl-1,3,4-oxdiazolone-(2) having a melting point of 72° C. (prepared by the action of ammonia on phenylhydrazine-β-carboxylic acid-ethyl ester-2-carboxylic acid-chloride) and p-phenetidine are heated for 5 hours to about 200° C. After having worked up as described in Example 2(f), there is obtained the 1-phenyl-4-(4-ethoxy-phenyl)-3,5-dioxo-1,2,4-triazolidine which has a melting point of 193–195° C.

(m) The same triazolidine is obtained when 1-phenyl-3,5-dioxo-1,2,4-triazolidine together with the equimolar quantity of p-phenetidine are heated for 5 hours to 200° C. whereupon ammonia is liberated, and the product is worked up in the manner described in Example 2(f).

(n) The same compound is formed when equimolar quantities of p-phenetidine-hydrochloride and phenylhydrazine together with urea are heated for 5½ hours to about 200° C.; the reaction product is then isolated in the manner described in Example 2(f).

The sodium salt of the 1-phenyl-4-(4-ethoxy-phenyl)-3,5-dioxo-1,2,4-triazolidine can be obtained in the form of well shaped crystals, for example, from isopropanol, upon addition of the calculated quantity of sodium methylate.

Analysis:

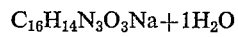

Calculated: C, 57.0%; H, 4.8%; N, 12.5%; Na, 6.8%; H₂O, 5.3%. Found: C, 56.9%; H, 4.8%; N, 12.6%, Na, 6.8%; H₂O, 5.2%.

EXAMPLE 3

*1-Phenyl-4-(4-Acetylamino-Phenyl)-3,5-dioxo-1,2,4-Triazolidine*

To a solution of 2-phenyl-4-(4-acetylamino-phenyl)-semicarbazide-carboxylic acid-(1)-ethyl ester, obtained by heating for one hour to 55–60° C. 48.5 g. of phenylhydrazine-β-carboxylic acid-ethyl ester-α-carboxylic acid-chloride with 60 g. of 4-acetyl-aminoaniline in 650 cc. of alcohol, are added 200 cc. of 2 N-sodium hydroxide solution, and the whole is heated for 15 minutes to 65–70° C. on the water-bath. After addition of charcoal the warm reaction solution is filtered with suction; after cooling, the filtrate contains the crystallized sodium salt of the triazolidine which is converted into the free compound by acidification with hydrochloric acid. The yield is 49.5 g., the melting point 288–290° C.

EXAMPLE 4

*1-Phenyl-4-(4-n-Butoxy-Phenyl)-3,5-Dioxo-1,2,4-Triazolidine*

To a solution of 45.7 g. of phenylhydrazine-β-carboxylic acid-methyl ester-α-carboxylic acid chloride having a melting point of 98–100° in 300 cc. of ethanol is added a solution of 33 g. of 4-n-butoxy-aniline and 24.2 g. of dimethylaniline in 150 cc. of ethanol and, after the reaction heat has decayed, the mixture is heated for one hour to 50–70° C. Together with 200 cc. of 2 N-sodium hydroxide sodium the reaction mixture is heated for so long a period on the steam bath until a clear solution is formed. The solution is diluted with water, clarified by extraction with ether and filtration with suction and addition of charcoal, and the triazolidine is precipitated by acidification. The final product is filtered with suction, washed with water, dried and recrystallized. Melting point 158–160° C. (from ethanol).

By the same method and with the use of correspondingly substituted anilines, there were prepared the following 3,5-dioxo-triazolidines and converted into the corresponding sodium salts either with the calculated quantity of sodium methylate or sodium hydroxide solution:

1-phenyl-4-(2-ethoxy-phenyl)-3,5-dioxo-1,2,4-triazolidine, melting point 182–184° C. (from ethanol);

1-phenyl-4-(4-phenoxy-phenyl)-3,5-dioxo-1,2,4-triazolidine, melting point 176–178° C. (from ethanol);

1-phenyl-4-(4-benzyloxy-phenyl)-3,5-dioxo-1,2,4-triazolidine, melting point 187–190° C. (from ethanol);

1-phenyl-4-(3-ethoxy-phenyl)-3,5-dioxo-1,2,4-triazolidine, melting point 162–163° C. (from methanol);

1-phenyl-4-(4-methoxy-phenyl)-3,5-dioxo-1,2,4-triazolidine, melting point 222–225° C. (from ethanol);

1-phenyl-4-(2-methoxy-phenyl)-3,5-dioxo-1,2,4-triazolidine, melting point 184-186° C. (from ethanol/water);

1-phenyl-4-[4-(β-hydroxy-ethoxy)-phenyl]-3,5-dioxo-1,2,4-triazolidine, melting point 172–173° C. (from ethanol).

EXAMPLE 5

*1-Phenyl-4-(4-Chloro-Phenyl)-3,5-Dioxo-1,2,4-Triazolidine*

The above-indicated compound is obtained when reacting 2-phenyl-4-(4-chloro-phenyl)-semicarbazide-carboxylic acid-(1)-methyl ester according to the method described in Example 2(a) and purifying the reaction product which is obtained in a yield of over 90% by dissolving it in dilute sodium hydroxide solution, filtering the solution by means of charcoal and precipitating by means of hydrochloric acid. Melting point 240–245° C.

EXAMPLE 6

*1,4-Bis-(4-Chloro-Phenyl)-3,5-Dioxo-1,2,4-Triazolidine*

27.7 g. of 4-chloro-phenylhydrazine-β-carboxylic acid-ethyl ester-α-carboxylic acid-chloride are reacted with 25.5 g. of 4-chloraniline in 75 cc. of ethanol by heating on the steam bath to form the 2,4-bis-(4-chloro-phenyl)-semicarbazide-carboxylic acid-(1)-ethyl ester, and the latter is converted into the triazolidine by addition of 100 cc. of sodium hydroxide solution to the reaction solution and short heating to about 80° C. The triazolidine is isolated in the usual manner in a yield of over 90%. The product crystallizes from dimethylformamide upon addition of alcohol and melts at 305–308° C. By dissolution in the calculated quantity of a methylalcoholic solution of sodium methylate and addition of ether, the sodium salt is obtained in the form of a colorless powder.

When using p-phenetidine instead of 4-chloroaniline, there is obtained in an analogous manner the 1-(4-chloro-phenyl)-4-(4-ethoxy-phenyl)-3,5-dioxo-1,2,4-triazolidine which has a melting point of 223–225° C. (from ethanol).

EXAMPLE 7

*1-(4-Methyl-Phenyl)-4-(4-Ethoxy-Phenyl)-3,5-Dioxo-1,2,4-Triazolidine*

The above compound is obtained according to the method described in Example 4 but with the use of 4-methyl-phenylhydrazine-β-carboxylic acid-ethyl ester-α-carboxylic acid-chloride, having a melting point of 93–94° C., and p-phenetidine. Melting point=182–183° C. (from ethanol). The sodium salt recrystallizes from methanol upon addition of ether.

We claim:
1. A member selected from the group consisting of a compound of the formula

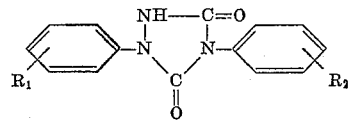

in which $R_1$ is a member selected from the group consisting of hydrogen, chlorine and methyl, and $R_2$ is a member selected from the group consisting of alkoxy of 1 to 4 carbon atoms, hydroxy-ethoxy, acetylamino, phenoxy and benzyloxy, and physiologically compatible basic salts thereof.

2. 1 - phenyl - 4-(4-ethoxy-phenyl)-3,5-dioxo-1,2,4-triazolidine.

3. 1 - phenyl - 4-(4-phenoxy-phenyl)3,5-dioxo-1,2,4-triazolidine.

4. 1 - (4-methyl-phenyl)-4-(4-ethoxy-phenyl-3,5-dioxo-1,2,4-triazolidine.

5. 1 - phenyl-4-(4-n-butoxyphenyl)-3,5-dioxo-1,2,4-triazolidine.

References Cited in the file of this patent

UNITED STATES PATENTS

| | | |
|---|---|---|
| 2,855,342 | Wagner et al. | Oct. 7, 1958 |
| 2,905,693 | Hafliger et al. | Sept. 22, 1959 |
| 2,909,465 | Kraft | Oct. 20, 1959 |
| 2,927,927 | Denss et al. | Mar. 8, 1960 |
| 2,944,060 | Close et al. | July 5, 1960 |

FOREIGN PATENTS

| | | |
|---|---|---|
| 775,925 | Great Britain | May 29, 1957 |
| 778,128 | Great Britain | July 3, 1957 |
| 806,759 | Great Britain | Dec. 31, 1958 |
| 1,244,321 | France | Sept. 19, 1960 |

OTHER REFERENCES

Heinrichs et al.: Ber. Deut. Chem., vol. 34, pages 2335–8 (1901).